Jan. 31, 1961     H. T. SZOSTAK     2,969,990

CLOSED AIR SUSPENSION SYSTEM FOR MOTOR VEHICLE

Filed Jan. 15, 1958

H. T. SZOSTAK
INVENTOR.

BY E. C. McRae
J. R. Faulkner
J. H. Oster

ATTORNEYS ical: circuit;
United States Patent Office 2,969,990
Patented Jan. 31, 1961

2,969,990

CLOSED AIR SUSPENSION SYSTEM FOR MOTOR VEHICLE

Henry T. Szostak, Dearborn, Mich., assignor to Ford Motor Company, Dearborn, Mich., a corporation of Delaware Filed Jan. 15, 1958, Ser. No. 709,009

11 Claims. (Cl. 280—124)

This invention relates generally to an air suspension system for a motor vehicle, and particularly to a system of the closed type.

An object of the present invention is to provide a motor vehicle air suspension system of the closed type incorporating leveling mechanism automatically maintaining a predetermined relationship between the vehicle chassis and the road wheels regardless of the load on the vehicle.

A further object of the invention is to provide a closed air suspension system utilizing a single high pressure storage tank and in which air exhausted from the air springs is transferred directly to the pressure tank, so that the capacity of the system to support vehicle loads cannot be depleted by frequent load changes. A still further object is to provide a system of this type in which the exhausting of the air springs during vehicle leveling is accomplished by operating the air compressor.

Another object is to provide a closed air suspension system in which the air compressor need not be operated continuously, but only when exhausting of the air springs takes place or when replenishment is required due to leakage. Still another object is to connect the exhaust side of the air springs directly to the intake side of the air compressor, under the control of control means responsive to the pressure in the connection to actuate the compressor. By arranging the control means to actuate the compressor whenever the pressure in the exhaust connection is above a predetermined minimum amount, complete exhausting of the air springs is prevented.

A still further object of the invention is to provide, in a closed air suspension system of the type described, means for preventing the further supply of air from the pressure tank to the air springs when the vehicle is stopped, and also means for operating the compressor for a limited time after the vehicle is stopped.

Other objects and advantages of this invention will become more apparent as the description proceeds, particularly when considered in connection with the accompanying drawings in which.

Figure 1:
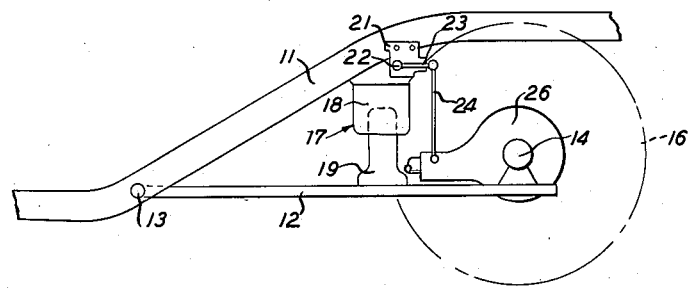
Figure 1 is a semidiagrammatic side elevational view of a portion of a vehicle chassis incorporating the present air suspension system.

Referring now to the drawings and particularly to Figure 1, the reference character 11 indicates a side frame rail of a motor vehicle chassis. A trailing arm 12 is pivotally connected to the frame rail at 13, and at its rearward end supports a rear axle 14 conventionally carrying rear road wheels 16.

An air spring 17 resiliently supports the vehicle chassis upon the rear road wheel 16, and includes telescopic elements 18 and 19 mounted respectively upon the frame rail 11 and the trailing arm 12. A leveling valve 21 is rigidly mounted upon the frame rail 11, and the actuating shaft 22 of the leveling valve is connected to an actuating arm 23 which in turn is connected by a link 24 to the differential carrier 26 of the rear axle assembly. It will be seen that with this arrangement, the leveling valve 21 is responsive to variations in the relationship between the vehicle frame and the rear road wheels.

Figure 2:
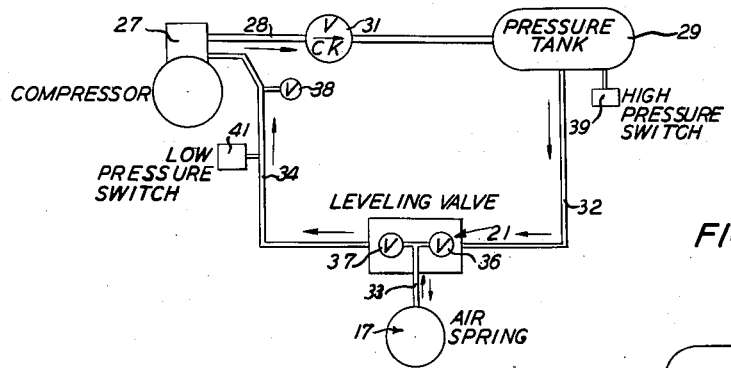
Figure 2 is a diagram of the system showing the air connections.

Referring now to Figure 2, it will be seen that the air suspension system of the present invention comprises an electric motor driven air compressor 27 having its high pressure side connected by a conduit 28 to a high pressure air storage tank 29. A check valve 31 is included in the conduit 28 to prevent return flow from the pressure tank to the compressor. A supply conduit 32 connects the pressure tank 29 with the leveling valve 21, and the latter is connected to the air spring 17 by means of a conduit 33. The leveling valve 21 is also connected by means of an exhaust conduit 34 to the low pressure side of the air compressor 27.

The leveling valve assembly 21 is conventional in construction, and various types of leveling valves may be used with this system. In the present instance, it includes an intake valve 36 arranged to be opened whenever the vehicle height is too low so that air can be supplied from the pressure tank 29 to the air spring 17 to restore the vehicle to its normal riding height. An exhaust valve 37 is also included in the leveling valve assembly, and is arranged to be opened whenever the vehicle height is too high so that air can be exhausted from the air spring 17 to restore the vehicle to its normal riding height.

It will be noted that for purposes of illustration only a single air spring 17 is shown in Figure 2, but it will be understood that a plurality of air springs may be used for the various road wheels, and that likewise a plurality of leveling valves may be used as desired to control the various air springs.

Still referring to Figure 2, it will be seen that the air suspension system is of the closed type so that outside air need be supplied to the system only in the event of leakage. This makeup or replenishing air may be admitted through an air valve 38 when needed, and is supplied to the high pressure tank 29 by the air compressor 27 whenever the pressure in the tank drops below a predetermined minimum value. This is controlled by means of a pressure actuated switch 39 connected to the pressure tank 29 and arranged to actuate the electric motor driven air compressor 27 when the tank pressure falls below the predetermined minimum value. This switch may, for example, be set at 150 p.s.i.

It will be seen that the pressure tank is directly connected to the intake leveling valve 36 by means of a supply conduit 32 so that air under pressure is always available and can be supplied immediately to the air spring 17 whenever the inlet valve 36 is opened. Whenever the exhaust valve 37 is opened, however, the air spring is placed in communication with the exhaust conduit 34, but the air from the spring can be exhausted only when the air compressor 27 is operated. To accomplish this, a pressure actuated switch 41 is connected to the exhaust conduit 34, and is arranged to operate the electric motor driven compressor 27 whenever the pressure in the exhaust conduit 34 is above a predetermined value. This value is set somewhat less than the normal air spring pressure so that the compressor will be operated to exhaust the exhaust air from the air spring whenever the exhaust leveling valve 37 is opened.

The low pressure switch 41, for example, may be set at 50 p.s.i., with the normal air spring pressure being in the order of 80 p.s.i. With this arrangement it will be seen that if exhausting continues until the pressure in the air spring 17 and the exhaust conduit 34 falls below 50 p.s.i., the low pressure switch 41 will be automatically opened to shut off the electric driven air compressor 27 so that further exhausting of the air spring cannot take place. This provides a minimum air pressure under all conditions for the air spring, and prevents the latter from being needlessly further exhausted under peculiar circumstances such as exist when a wheel is jacked up to change a tire or when the car is on a hoist. In a conventional system the air spring would be completely exhausted under such conditions, necessitating a refill of the latter when conditions returned to normal operation.

An advantage of the present system is that the capacity of the system to support the vehicle load and to maintain the vehicle at a normal riding height can never be depleted by frequent load changes, as sometimes takes place with a conventional open system and also with a conventional closed system in which the air springs are exhausted to a low pressure tank. With the present system, the quantity of air under pressure to support the load must necessarily either be in the air springs themselves or in the high pressure storage tank, in which case it can be immediately supplied to the air springs when necessary.

The pressure tank 29 serves to store the excess quantity of air between that required by the air springs under no-load conditions and full-load conditions. For example, with the vehicle fully loaded, the normal vehicle height is maintained by increasing the air quantity in the air springs. Hence, the quantity of air in the tank will be at a minimum, and likewise the pressure in the tank will be at its minimum value. When the vehicle is empty, however, the normal vehicle height can be maintained with a smaller quantity of air in the air springs, and the excess air is supplied by the compressor to the pressure tank, increasing the pressure in the latter. The pressure in the storage tank thus fluctuates between minimum and maximum values, and may, for example, range from 150 p.s.i. to 200 p.s.i. With the pressure thus maintained between definite limits, the system will operate satisfactorily without a pressure regulator valve which is usually required in a conventional system.

Figure 3:
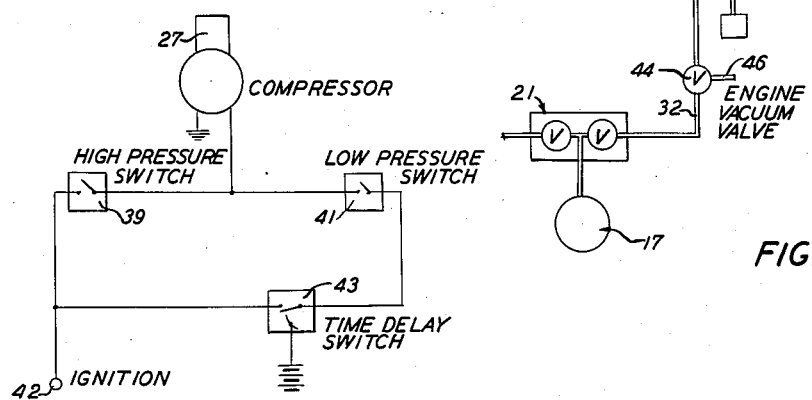
Figure 3 is a diagram of the system showing the electrical circuit.

Referring now to Figure 3, there is shown a wiring diagram for the electrical circuit of the air suspension system shown in Figure 2. It will be seen that the electric motor driven air compressor 27 is operated by means of either the high pressure switch 39 or the low pressure switch 41, with the power being supplied from the conventional accessory terminal 42 of the vehicle ignition systems. The high pressure switch 39, of course, actuates the compressor when the system pressure drops due to leakage to replenish lost air, while the low pressure switch 41 operates the compressor to exhaust the air spring when the leveling system calls for exhaust. While the low pressure switch 41 may be set to operate the compressor at a relatively low pressure, it is preferably set at an intermediate pressure for the purpose discusssed above.

If desired, a time delay electric switch 43 may be added to the circuit. Without a time delay switch it would be impossible to operate the low pressure switch with the ignition off. Consequently, if passenger exit were to take place after the ignition was turned off, the car would not return to its normal height but would remain high and possibly out of trim. This might be undesirable from the appearance standpoint, and the time delay switch is incorporated in the circuit to permit leveling to take place for a predetermined limited time interval after the ignition is shut off. During this interval, the compressor may be operated to exhaust air from the air spring to return the vehicle to its normal riding height.

Figure 4:
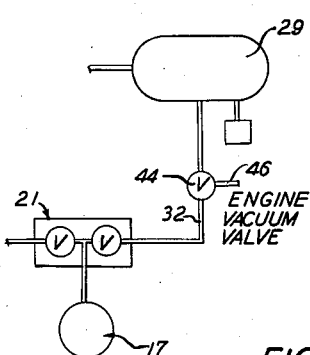
Figure 4 is a fragmentary diagram showing a modification.

Reference is made now to Figure 4, which illustrates a further modification in the form of a valve 44 in the supply conduit 32 between the pressure tank 29 and the leveling valve 21. The valve 44 is connected by means of a conduit 46 to the manifold of the vehicle engine to be responsive to engine vacuum, and is arranged to open the conduit 32 whenever the engine is operating and to close the conduit when the engine is stopped. Further supply of air from the pressure tank to the air springs thus cannot take place with this modification after the vehicle engine is stopped.

When used in the specification and claims, the term "air" is intended to mean any gaseous material.

It will be understood that the invention is not to be limited to the exact construction shown and described, but that various changes and modifications may be made without departing from the spirit and scope of the invention, as defined in the appended claims.

What is claimed is:

1. In a motor vehicle having a sprung member and an unsprung member, an air spring resiliently connecting said members, an air compressor, a pressure tank, leveling valve means, supply passage means establishing communication between the high pressure side of said compressor, said pressure tank and said leveling valve means, exhaust passage means establishing communication between said leveling valve means and the low pressure side of said compressor, passage means establishing communication between said leveling valve means and said air spring, and control means responsive to pressure in said exhaust passage means above a predetermined value to actuate said compressor to pump air from said air spring to said pressure tank.

2. The structure defined by claim 1 which is further characterized in that said air compressor is driven by an electric motor, and said control means comprises a pressure operated electric switch open below a predetermined air pressure but closed above said predetermined air pressure to actuate said electric motor and said air compressor.

3. The structure defined by claim 2 which is further characterized in that a second pressure responsive electric switch is responsive to pressure in said pressure tank below a predetermined value to actuate said electric motor and said air compressor.

4. The structure defined by claim 2 which is further characterized in that the electric circuit including said compressor motor and said pressure operated electric switch is connected to the vehicle ignition for its power supply, and a time delay switch in said circuit energizing said circuit for a limited time interval after the vehicle ignition is shut off.

5. The structure defined by claim 1 which is further characterized in that an engine vacuum responsive valve is located in said supply passage means to close said passage means and prevent the flow of air from said pressure tank to said air spring when the vehicle engine is stopped.

6. In a motor vehicle having a frame member and a road wheel member, an air spring resiliently connecting said members, an air compressor having an inlet connection and a discharge connection, means including a storage tank connecting the discharge connection of said compressor to said air spring to supply air to said air spring, passage means directly connecting said air spring to the inlet side of said compressor, a pressure actuated control connected to said passage means and responsive to a predetermined minimum pressure in said passage means to actuate said air compressor to transfer air from said air spring to said storage tank, and leveling means responsive to variations in the relationship between said members to control the flow of air to and from said air spring.

7. In a motor vehicle having sprung and unsprung members, an air spring resiliently connecting said members, an air compressor and a high pressure storage tank connected to said air spring in a closed circuit, said storage tank being connected between the high pressure side of said compressor and said air spring, control means responsive to the relative positions to said members to admit air from said storage tank to said air spring to raise the vehicle height, and pressure responsive control means for said compressor connected between the low pressure side of said compressor and said air spring to start said compressor and to pump air from said air spring to said storage tank to lower the vehicle height.

8. In a motor vehicle having a sprung member and an unsprung member, an air spring resiliently connecting said members, an air compressor, a pressure tank, leveling valve means, supply passage means establishing communication between the high pressure side of said compressor, said pressure tank and said leveling valve means, exhaust passage means establishing communication between said leveling valve means and the low pressure side of said compressor, passage means establishing communication between said leveling valve means and said air spring, and control means responsive to pressure in said exhaust passage means to actuate said compressor to pump air from said air spring to said pressure tank.

9. In a motor vehicle having a frame member and a road wheel member, an air spring resiliently connecting said members and having an inlet and an exhaust, an air compressor having an inlet and a discharge, passage means connecting the discharge of said compressor to the inlet of said air spring, a storage tank in said passage means, leveling valve means responsive to the relationship between said members to admit air from said storage tank to said air spring to raise the vehicle height, additional passage means connecting the exhaust of said air spring to the inlet of said compressor, and control means associated with said last named passage means to operate said compressor to transfer air from said air spring directly to said storage tank to lower the vehicle height.

10. In a motor vehicle having a sprung member and an unsprung member, an air spring resiliently connecting said members, supply passage means establishing communication between the high pressure side of said compressor, said pressure tank and said air spring, exhaust passage means establishing communication between said air spring and the low pressure side of said compressor, an inlet leveling valve responsive to a decrease in the distance between said sprung and unsprung members to admit air from said pressure tank to said air spring to raise the vehicle height, an exhaust leveling valve responsive to an increase in the distance between said sprung and unsprung members to exhaust air from said air spring to said exhaust passage means, and control means responsive to an increase in the pressure in said exhaust passage means to start said compressor to transfer the exhaust air in said exhaust passage means directly to said pressure tank.

11. In a motor vehicle, an air compressor, a high pressure storage tank and an air spring in series with each other in a closed air suspension system, means responsive to a decrease in the riding height of the vehicle to admit air from said high pressure storage tank to said air spring to raise the vehicle height, and means responsive to an increase in the riding height of the vehicle to operate said compressor to transfer air directly from said air spring to said high pressure storage tank to decrease the vehicle height.

References Cited in the file of this patent

UNITED STATES PATENTS

| | | |
|---|---|---|
| 587,690 | Ashley | Aug. 10, 1897 |
| 1,105,805 | Liebowitz | Aug. 4, 1914 |
| 1,544,850 | Messier | July 7, 1925 |
| 2,843,396 | Lucien | July 15, 1958 |
| 2,862,725 | Jackson | Dec. 2, 1958 |